United States Patent [19]

Parthasarathi

[11] Patent Number: 5,204,968
[45] Date of Patent: Apr. 20, 1993

[54] AUTOMATIC DETERMINATION OF OPERATOR TRAINING LEVEL FOR DISPLAYING APPROPRIATE OPERATOR PROMPTS

[75] Inventor: Aanand Parthasarathi, Fairport, N.Y.

[73] Assignee: Xerox Corporation, Stamford, Conn.

[21] Appl. No.: 328,975

[22] Filed: Mar. 27, 1989

[51] Int. Cl.$^5$ .................................... G06F 11/28
[52] U.S. Cl. ........................ 395/800; 364/972; 364/972.1; 364/286.1; 364/274.3; 364/DIG. 1; 395/155
[58] Field of Search ............... 364/200, 900; 395/425, 395/155, 156, 157, 158, 159, 160, 161, 800; 434/323, 118, 176

[56] References Cited

U.S. PATENT DOCUMENTS

| | | | |
|---|---|---|---|
| 4,322,814 | 3/1982 | Menezes et al. | 364/900 |
| 4,332,464 | 6/1982 | Bartulis | 355/243 |
| 4,438,326 | 3/1984 | Uchida | 235/379 |
| 4,475,189 | 10/1984 | Herr | 370/62 |
| 4,649,515 | 3/1987 | Thompson et al. | 364/900 |
| 4,682,158 | 7/1987 | Ito | 364/146 |
| 4,792,827 | 12/1988 | Ogura | 355/14 C |
| 4,964,077 | 10/1990 | Eisen | 364/900 |
| 5,008,810 | 4/1991 | Kessel | 364/200 |

*Primary Examiner*—Thomas C. Lee
*Assistant Examiner*—Eric Coleman
*Attorney, Agent, or Firm*—Ronald Chapuran

[57] ABSTRACT

A method of automatically altering the messages for prompting an operator, depending upon the level of operator training, in a reproduction machine having a control and user interface with display including the steps of programming the machine at a first level, recognizing the programming of the machine at the first level to represent either trained or untrained operator programming, responding to the recognition of either trained or untrained operator programming at the first level for providing either a trained sequence of operator prompts or an untrained sequence of operator prompts, programming the machine at a second level after completion of the programming at the first level, recognizing the programming of the machine at the second level to be either trained or untrained operator programming, and responding to the recognition of either trained or untrained operator programming at the second level for providing either a trained sequence of operator prompts or an untrained sequence of operator prompts.

3 Claims, 7 Drawing Sheets

AUTOMATIC DETERMINATION OF OPERATOR TRAINING LEVEL FOR DISPLAYING APPROPRIATE OPERATOR PROMPTS

The invention relates to a system for controlling operator prompts, and more particularly, to a method for automatically determining the level of operator competence and providing different levels of operator messages and prompts in response thereto.

As reproduction machines such as copiers and printers become more complex and versatile in the jobs they can do, the user interface between the machine and the operator or user, which in essence permits the dialogue between operator and machine, must necessarily be expanded if full and efficient utilization of the machine is to be realized. A suitable interface must not only provide the controls, displays, and messages necessary to activate, program, monitor, and maintain the machine, but must also provide a level of messages and operator prompts for a wide range of trained and untrained operators to accurately and efficiently program the machine for a complex reproduction run.

Various prior art techniques are directed to operator messages and prompts as described below:

U.S. Pat. No. 4,322,814 to Menezes et al. discloses an error detection system for use in an editing apparatus. The system includes a central processing unit comprising an error detector responsive to the operation of a control switch to detect if data displayed in a selected display register is enabling for carrying out an editing operation. If the data is not enabling, the system inhibits the edit operation and actuates selected ones of indicators to notify an operator of an error condition.

U.S. Pat. No. 4,649,515 to Thompson et al. discloses a method and apparatus for fault diagnosis and control of a system. The system comprises two levels of rules including domain specific rules in the form of a list stored in a memory, and meta-level rules also stored in memory. The meta-level rules search a knowledge base and effectively construct a rule network to detect and report malfunctions, output control signals for modifying the operation of a monitored system, and aid users by providing information relative to malfunctions which pinpoints probable causes.

U.S. Pat. No. 4,682,158 to Ito et al. discloses a guidance device for controlling various functions of a machine. Sensors within a machine respond to various maintenance or diagnostic conditions. Signals from the sensors cause a storage means to supply corresponding prompts to a display to prompt a needed maintenance or diagnostic procedure. When an appropriate procedure has been performed, additional prompts for subsequent procedures are displayed if appropriate.

U.S. Pat. No. 4,438,326 to Uchida discloses a system for performing transactions wherein a customer may follow instructions comprising a procedure specifying message and a procedure specifying illustration. In a test mode selected by a clerk, a display unit shows an operation test code for a particular function button. When a trouble has been detected, the display unit shows the cause of the detected trouble and provides instructions for the clerk.

U.S. Pat. No. 4,792,827 to Ogura discloses a display device for use in an image forming apparatus including a condition detection member, a display section, and a first input key for causing a first message to be displayed on the display section. The first message represents guidance for operating the apparatus. Second and third input keys are further provided for causing second and third messages to be displayed representative of guidance for an operation procedure.

A difficulty with the prior art systems is that generally there is not a means to differentiate between trained and untrained, skilled or unskilled machine operators. If the machine messages and prompts are geared to an untrained level, a skilled operator will become impatient and maybe even confused by the slow, deliberate display of messages and prompts intended for an unskilled operator. At best the efficiency of the skilled operator will be compromised, and the deliberate style of displays could even lead to programming errors. On the other hand, a machine user interface geared to a skilled level of operator may be efficient for the skilled operator, but could easily result in confusion and delay for the unskilled operator. Since most machines are usually operated by operators with a range of skill levels, it would be desirable to provide a machine user interface that can not only be adapted to a wide range of skill levels, but can be automatically adapted by responding to the sequence or style of programming of the operator.

It is an object of the present invention, therefore, to provide a new and improved technique for adapting to the skill and training of the operator, and in particular, for automatically determining the skill level of the operator and for automatically providing for different levels of messages and operator prompts in response to the determined skill level. Further advantages of the present invention will become apparent as the following description proceeds and the features characterizing the invention will be pointed out with particularity in the claims annexed to and forming a part of this specification.

SUMMARY OF THE INVENTION

Briefly, the present invention is the method of automatically altering the messages for prompting the operator, depending upon the level of operator training, in a reproduction machine having a control and user interface with display including the steps of programming the machine at a first level, recognizing the programming of the machine at the first level to represent either trained or untrained operator programming, responding to the recognition of either trained or untrained operator programming at the first level for providing either a trained sequence of operator prompts or an untrained sequence of operator prompts, programming the machine at a second level after completion of the programming at the first level, recognizing the programming of the machine at the second level to be either trained or untrained operator programming, and responding to the recognition of either trained or untrained operator programming at the second level for providing either a trained sequence of operator prompts or an untrained sequence of operator prompts.

For a better understanding of the present invention, reference maybe had to the accompanying drawings wherein the same reference numerals have been applied to like parts and wherein:

IN THE DRAWINGS

DETAILED DESCRIPTION OF THE INVENTION

Figure 1:
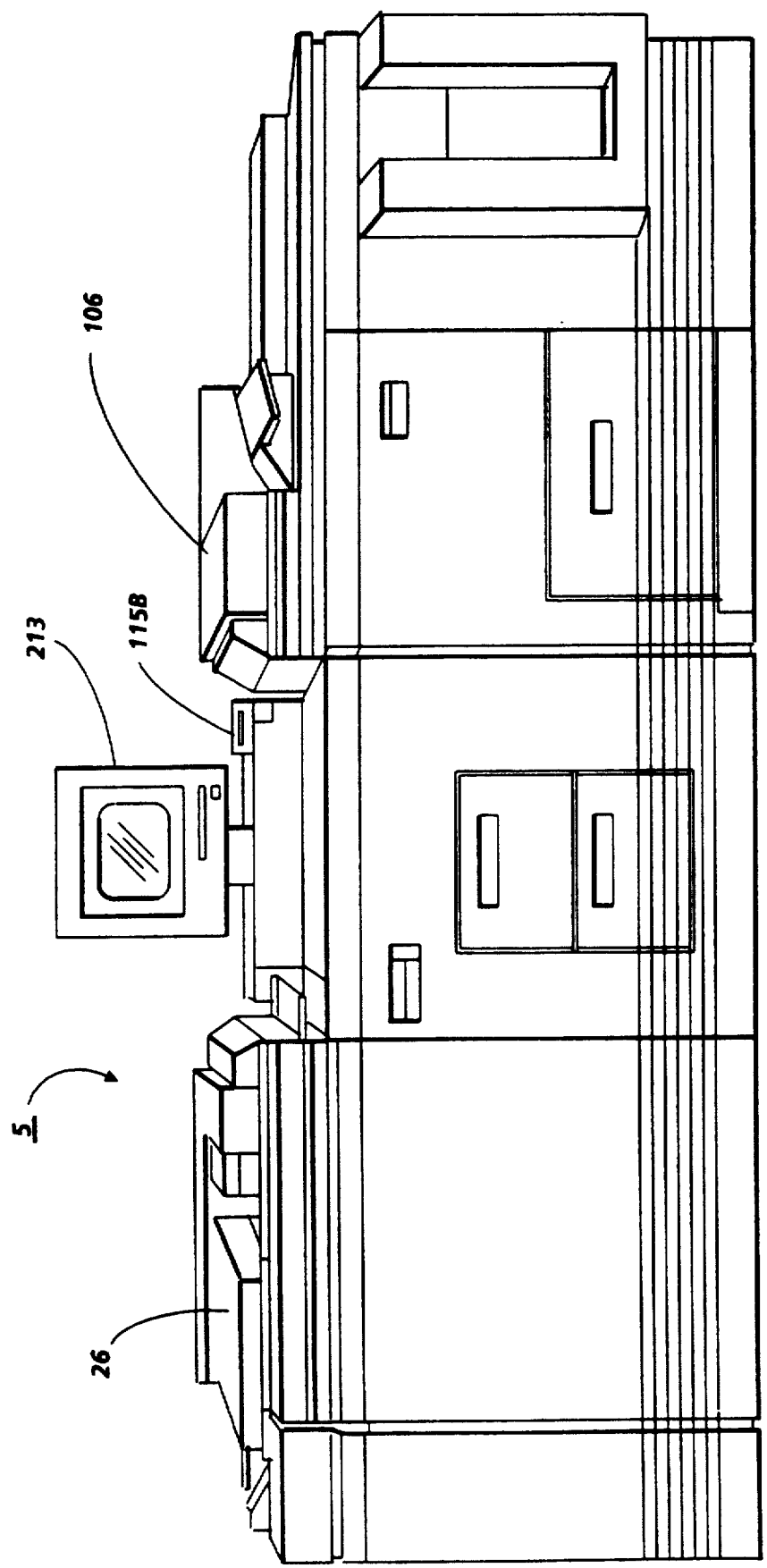
FIG. 1 is an isometric view of an illustrative reproduction machine incorporating the present invention.
Figure 2:
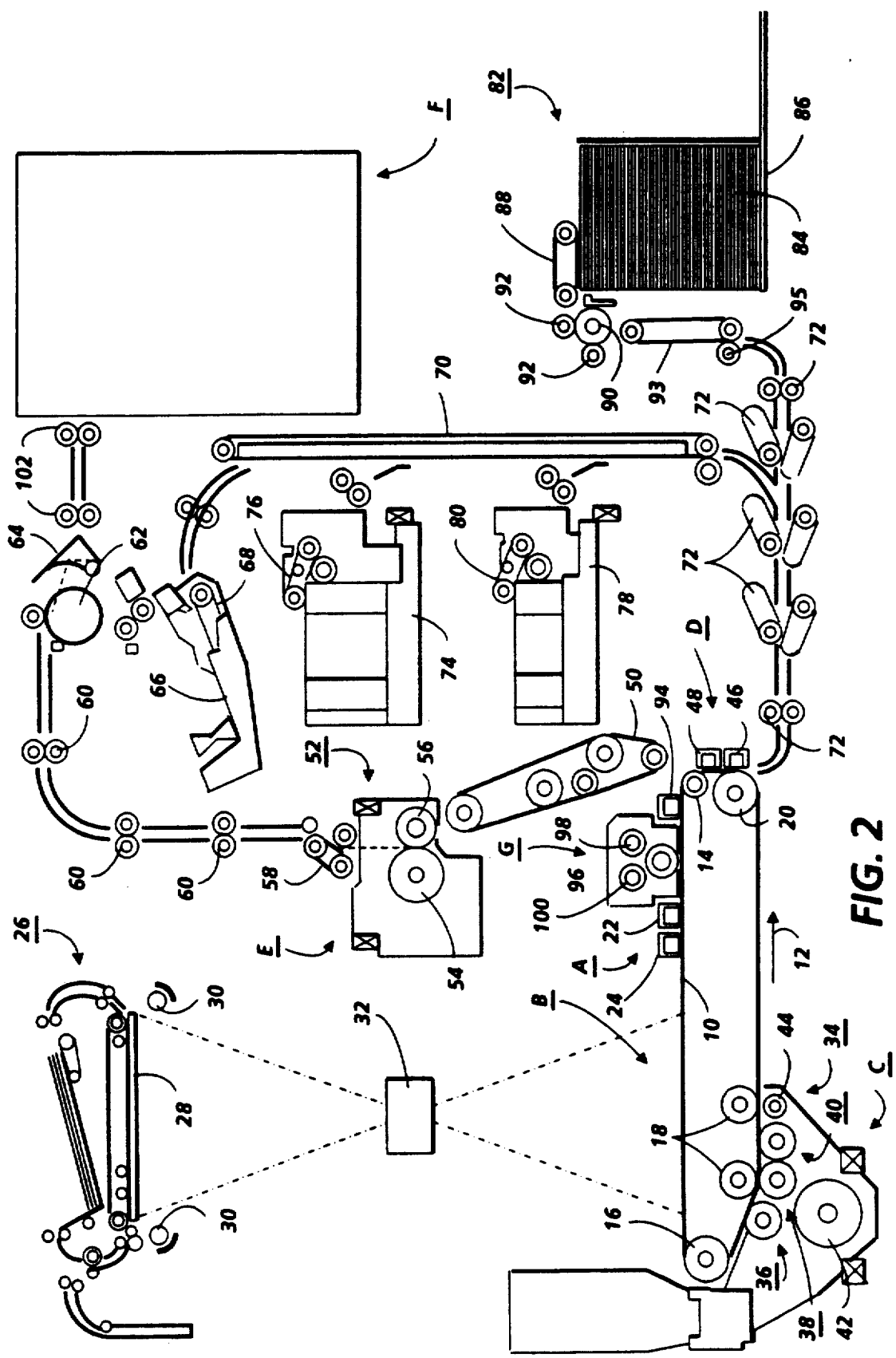
FIG. 2 is a schematic elevational view depicting various operating components and sub-systems of the machine shown in FIG. 1.

Referring to FIGS. 1 and 2, there is shown an electrophotographic reproduction machine 5 composed of a plurality of programmable components and sub-systems which cooperate to carry out the copying or printing job programmed through a touch dialogue User Interface (U.I.). Machine 5 employs a photoconductive belt 10. Belt 10 is entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detack the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station D.

After transfer station D, photoconductive belt 10 passes beneath corona generating device 94 which charges any residual toner particles remaining on belt 10 to the proper polarity. Thereafter, a precharge erase lamp (not shown), located inside photoconductive belt 10, discharge the photoconductive belt in preparation for the next charging cycle. Residual particles are removed from belt 10 at cleaning station G by an electrically biased cleaner brush 96 and two de-toning rolls 98 and 100.

The various functions of machine 5 are regulated by a controller which preferably comprises one or more programmable microprocessors. The controller provides a comparison count of the copy sheets, the number of documents being recirculated, the number of copy sheets selected by the operator, time delays, jam corrections, etc. As will appear, programming and operating control over machine 5 is accomplished through a User Interface. Operating and control information, job programming instructions, etc. are stored in a suitable memory which includes both ROM and RAM memory types. Conventional sheet path sensors or switches may be utilized to keep track of the position of the documents and the copy sheets. In addition, the controller regulates the various positions of the gates depending upon the mode of operation selected.

Figure 3:
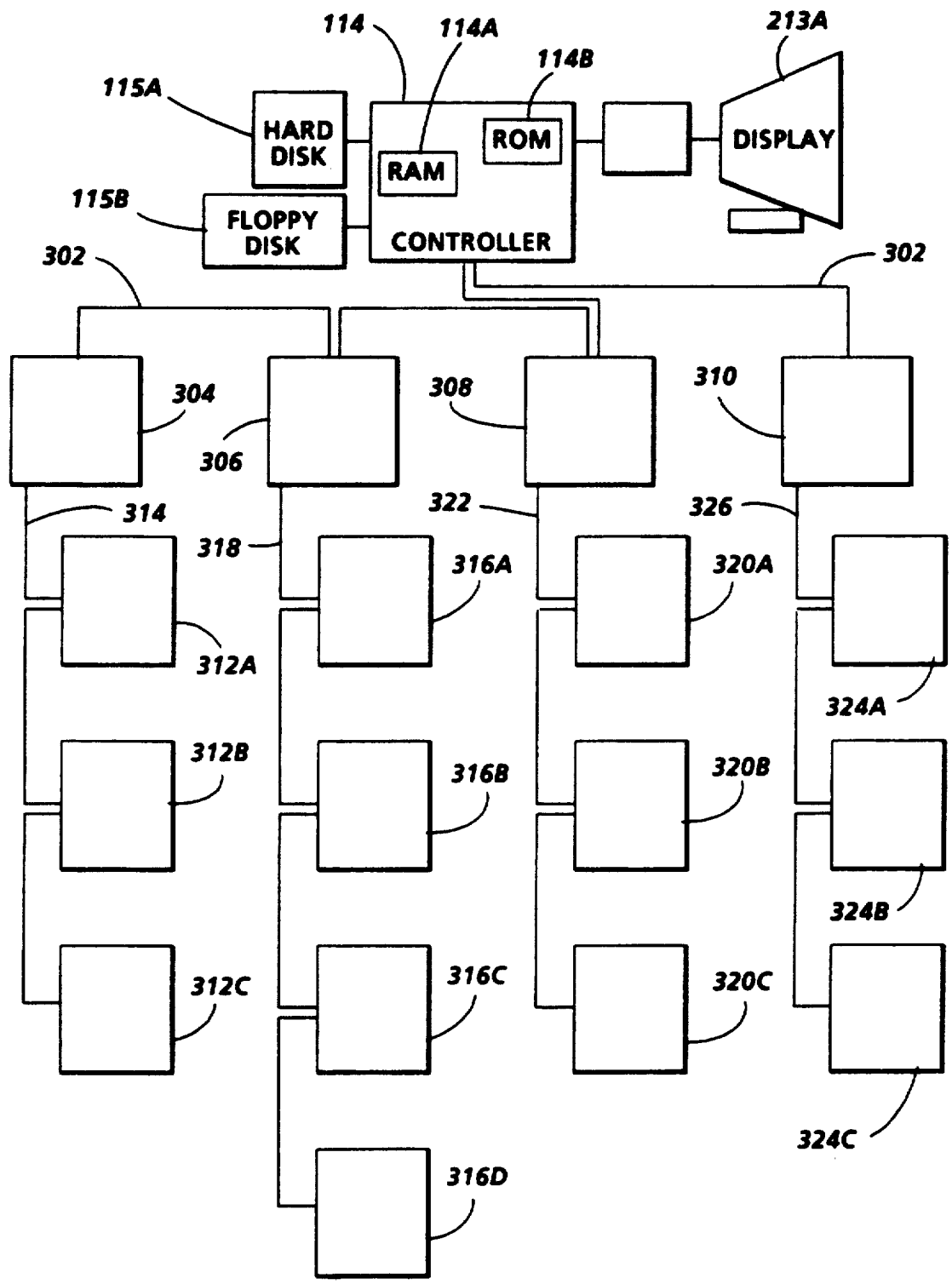
FIG. 3 is a block diagram of the operating control systems and memory for the machine shown in FIG. 1.

With reference to FIG. 3, memory 115 includes a hard or rigid disk drive 115A and a floppy disk drive 115B connected to Controller 114. In a preferred embodiment, the rigid disks are two platter, four head disks with a formatted storage capacity of approximately 20 megabytes. The floppy disks are 3.5 inch, dual sided micro disks with a formatted storage capacity of approximately 720 kilobytes. Preferably, all of the control code and screen display information for the machine is loaded from the rigid disk at machine power up. Changing the data that gets loaded into the machine for execution can be done by exchanging the rigid disk in the machine 5 for another rigid disk with a different version of data or by modifying the contents of the current rigid disk by transferring data from one or more floppy disks onto the rigid disk using the floppy disk drive built into the machine 5. Suitable display 213A of U.I. 213 is also connected to Controller 114 as well as a shared line system bus 302.

The shared line system bus 302 interconnects a plurality of core printed wiring boards including an input station board 304, a marking imaging board 306, a paper handling board 308, and a finisher/binder board 310. Each of the core printed wiring boards is connected to local input/output devices through a local bus. For example, the input station board 304 is connected to digital input/output boards 312A and 312B and servo board 312C via local bus 314. The marking imaging board 306 is connected to analog/digital/analog boards 316A, 316B, digital input/output board 316C, and stepper control board 316D through local bus 318. In a similar manner, the paper handling board 308 connects digital input/output boards 320A, B and C to local bus 322, and finisher/binder board 310 connects digital input/output boards 324A, B and C to local bus 326.

Figure 4:
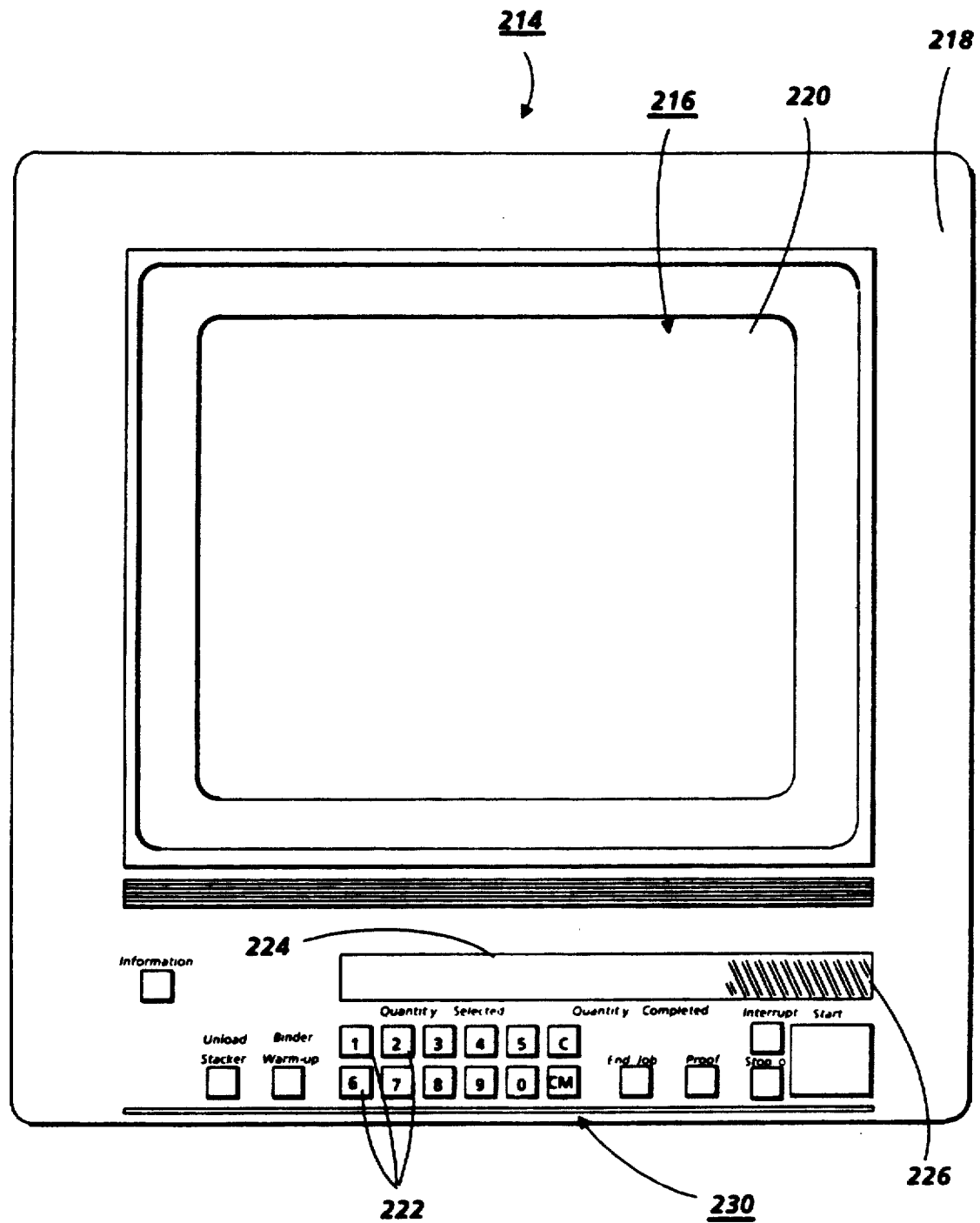
FIGS. 4 and 5 are front views of the user interface of the machine of FIG. 1.

Referring to FIG. 4, there is shown the color touch monitor 214 for the touch dialogue U.I. 213 of the present invention. As will appear, monitor 214 provides an operator user interface with hard and soft touch control buttons enabling communication between operator and machine 10. Monitor 214 comprises a suitable color cathode ray tube 216 of desired size and type having a peripheral framework forming a decorative bezel 218 thereabout. Bezel 218 frames a rectangular video display screen 220 on which soft touch buttons in the form of icons or pictograms and messages are displayed as will appear together with a series of hard control buttons 222 and 10 seven segment displays 224 therebelow. Displays 224 provide a display for copy "Quantity Selected", copy "Quantity Completed", and an area 226 for other information.

Hard control buttons 222 comprise "0-9" buttons providing a keypad 230 for programming copy quantity, code numbers, etc., a clear button "C" to reset display 224; a "Start" button to initiate print; a clear memory button "CM" to reset all dialogue mode features to default and place a "1" in the least significant digit of display 224; an "Unload Stacker" button requesting transfer of the contents of stacker 128; a "Stop" button to initiate an orderly shutdown of machine 5; a "Binder Warm-up" button to initiate warm-up of binder 126; an "Interrupt" button to initiate a job interrupt; a "Proof" button to initiate making of a proof copy; an "End Job" button to end the current job; and an "i" button to initiate a request for information.

Figure 5:
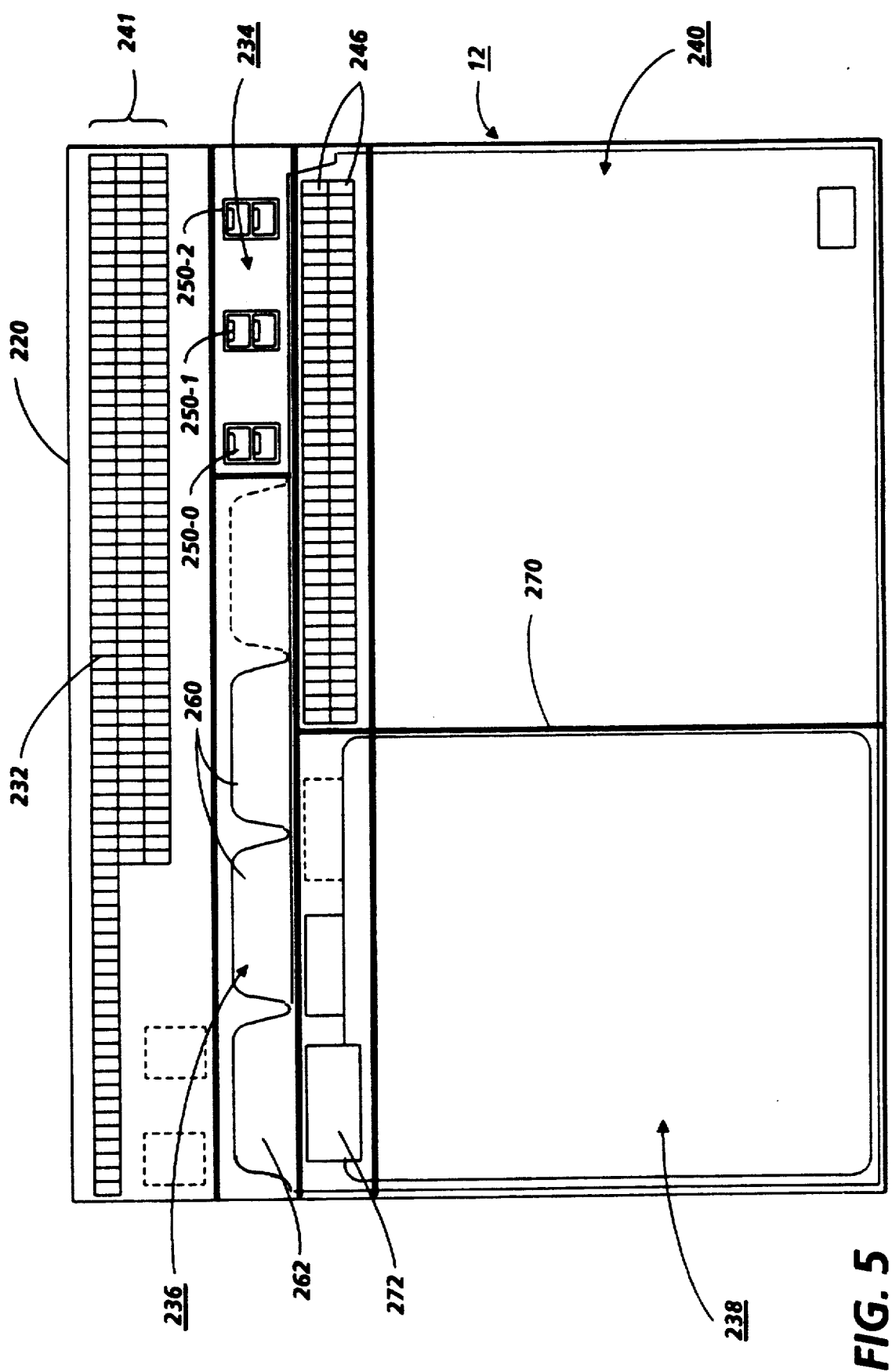

Referring now to FIG. 5, for dialogue purposes, screen 220 of monitor 214 is separated into five basic display areas, identified as a message area 232, a dialogue mode selection area 234, a dialogue pathway selection area 236, a scorecard selection area 238, and a work selection area 240.

Message area 232 consists of 3 lines 241 located at the top of screen 220. In addition, two programming conflict message lines 246 are provided in work selection area 240. The dialogue mode selection area 234 comprises an active area containing certain top level dialogue mode controls available to the operator. The mode controls are soft touch buttons 250-0, 250-1, and 250-2 in the form of icons representing file cabinets located on the right side of the screen 220 directly below message area 232.

The dialogue pathway selection area 236 and the scorecard selection area 238 basically simulate a card within a card filing system with primary dialogue pathway file folders 260 and secondary file cards, the latter being referred to as scorecards 270. As will appear, scorecards 270 provide additional programming pathway options. File folders 260 and scorecards 270 are arranged in overlaying relation one in front of the other. The dialogue pathway file folders 260, which are located beneath message area 232 and which extend up into the dialogue mode area 234, each have an outwardly projecting touch tab 262 along the top edge identifying the dialogue pathway represented by the folder, as for example STANDARD, FANFOLD, OVERSIZED, etc. To allow the file folders 260 to be distinguished from one another without the need to reshuffle the folders each time it is desired to display a folder hidden behind the folder currently displayed, each tab 262 is offset from the other so that tabs 262 are always visible whatever folder is displayed.

Scorecard selection area 238 appears in the lower left corner of screen 220 beneath dialogue selection area 234 and extends to the border of work selection area 240. Scorecard selection area 238 contains a file of scorecards 270 which present the features (first level program selections) available with each of the dialogue pathway file folders 260. As seen in FIG. 17 for example, area 238 displays the features (first level program selections) resident with the currently selected scorecard, such selections remaining at previously selected options until either timeout or the "CM" button (FIG. 4) is pressed. Two or three scorecards 270 are typically provided, depending on the dialogue pathway file folder 260 selected. Scorecards 270 each comprise a relatively small file card arranged in overlaying relation to one another so as to simulate a second but smaller card file. Each scorecard 270 has a touch tab 272 displaying the programming pathway options available with the scoreboard, such as PROGRAM, EXCEPTION, etc.. Scorecard tabs 272 are offset from one another to enable the identity of each scorecard to be determined whatever its position in the scorecard file. Additionally, scorecard tabs 272 are shaped different than the dialogue pathway file folder tabs 262 to prevent confusion.

Work selection area 240 appears in the lower right portion of screen 220, area 240 being beneath the dialogue pathway area 236 and extending from the edge of scorecard selection area 238 to the right side of screen 220. The top two lines 246 of the work selection area 240 are reserved for programming conflicts and prompts with the remaining area used for displaying the feature options (second level program selections) available with the first level program selection that is touched on the scorecard currently selected, an example of which is seen in FIG. 18. As will appear, the operator can scan and make a selection within the work area or pick another scorecard item.

In order for the soft touch buttons (i.e., icons) on screen 220 to provide information regarding both their current selection state and their current status, a display convention is provided that will allow the operator to quickly scan the display and determine current feature selections. Referring to Table 1, unselected features that are selectable are indicated by an outlined icon with a shadowed background while selected features that are selectable are indicated by a colorfilled icon with a shadowed background. Unselected features that are not selectable are indicated by an outlined icon without a shadowed background while selected features that are not selectable are indicated by a colorfilled icon without a shadowed background.

In cases where an unselected feature that is not selectable is touched, a message will be displayed in the programming conflict area 246 of screen 220. There are five operating states for U.I. 213 consisting of (1) CURRENT JOB, (2) PROGRAM AHEAD (3) TOOLS, (4) FAULTS, and (5) INFORMATION. The INFORMATION state is entered by means of a hard control button "i" on bezel 218 while the FAULTS state is in the form of a file card that overlays the file cards currently displayed in the event of a fault. The CURRENT JOB, PROGRAM AHEAD, and TOOLS states are entered by pressing the soft touch buttons 250-0, 250-1 and 250-2 respectively displayed on screen 220 in the Dialogue Mode Selection area 234.

For purposes of discussing the Group Exception Programming feature of the present invention, U.I. 213 is presumed to be in the CURRENT JOB state as a result of actuation of soft touch button 250-0. The functions of this state are to inform the operator of the daily tasks that are necessary to keep machine 5 in good working order, to allow the operator to program feature selections for the current job, and to allow the operator to run a copying job. The CURRENT JOB state is sub-divided into three cases: (1) "Job Complete", (2) "Print", and (3) "Job Incomplete". "Job Complete" implies that a job is not in progress and has been completed, "Print" refers to a job in progress, and "Job Incomplete" refers to a job in progress that has either voluntarily or involuntarily been stopped or interrupted. "Job Complete" is defaulted to except for the "Print" case.

The CURRENT JOB state can exit to the PROGRAM AHEAD state by touching the PROGRAM AHEAD button 250-1 in any of the "Job Complete", "Job Incomplete" or "Print" cases; or can exit to the INFORMATION state by pressing the "i" hard button on bezel 218; or can exit to the TOOLS state by touching the TOOLS soft touch button 250-2 in either the "Job Complete" or "Job Incomplete" cases. In addition the CURRENT JOB state will automatically enter the FAULT state when a fault occurs.

When entered in the CURRENT JOB state, the dialogue pathway file folders 260 tabbed STANDARD, OVERSIZED, and FANFOLD are displayed providing various dialogue pathway selections in the form of scorecards 270. The function and the behavior of these tabbed file folders within the dialogue pathway selection area 236 for the "Job Complete", "Job Incomplete", and "Print" cases as well as further details of the above described system are further described in D/87184, application Ser. No. 07/164,365 filed Mar. 3, 1988 and incorporated herein.

In operation, the control of the reproduction machine includes standard or default format for operator instructions responding to a standard programming procedure. In a preferred embodiment, the standard or default format is a sequence of instructions for a trained operator in response to a programming procedure from a trained operator rather than from an untrained operator. Upon sensing a mode or method of programming that is not in accordance with the standard format, the machine control senses that an untrained operator is programming the machine and will respond with an appropriate sequence of messages for an untrained operator.

For example, assume that the job requirement dictates special cover sheets or covers be provided from a predetermined machine tray for each set of the documents to be copied. For such a requirement or job operation, it is necessary to load in the machine document handler the set of documents to be copied. In the trained operator mode, if the operator selects "covers" at the operator console, and loads the document handler with the set of documents to be copied, no instructional message will appear at all on the display for the operator.

On the other hand, in a specific embodiment assume the operator selects the "covers" operation at the operator console, but does not load a set of documents into the document handler. If the operator then attempts to begin the job run by pressing the start button, the machine control sensing that there are no sets in the document handler, determines that the machine is in an untrained operator mode. In a sense, the machine is determining that the operator does not understand the significance or the type of operation that has been selected. Accordingly, the machine control determines that the operator is not trained and will provide the message "Not Ready, copy from the document handler when covers are selected". This message will remain displayed at the operator console until the operator has loaded a set of documents into the recirculating document handler.

Another example is the requirement for image shift. In a preferred embodiment, the machine will respond to an image shift only when the documents are presented in a specific manner such as via the circulating document handler or via a feeder slot rather than a document being positioned on the platen. If the operator selects image shift and then loads documents via the feeder slot or the recirculating document handler, the machine control will recognize the programming procedure of a trained operator and no instructional message will be provided.

However, assume the operator selects image shift and does not load the recirculating document handler or the feeder slot. If the operator then attempts to begin the job run, the machine control sensing that the programming procedure is inconsistent with a trained operator procedure determines that the programming procedure is that of an untrained operator. In response, the machine control will provide the message "Not Ready, copy from the document handler or feeder when shift is selected." As in the case with selection of covers, this message will remain on display until the feeder slot or the recirculating document handler is loaded. It should be noted that in a specific embodiment, the determination of an untrained operator assumes some prior transition by the operator, such as pressing the start button after selecting image shift, but neglecting to load the RDA or feeder slot.

As another example, the operator can enter the number of documents from a set of documents to be copied at the control console in order to prevent the recirculating document handler from initiating a precount of the number of documents. This is done to reduce the number of circulations in the recirculating document handler. In a trained operator mode, when the operator inputs the number of documents for the job and then loads the recirculating document handler to run the job, no instructional messages are provided to the operator at the display. On the other hand, assume the operator does not load the recirculating document handler with the set of documents to be copied and selects the number of the documents to be copied, Upon attempting to run the job by pressing the start button, the control will assume an untrained operator and will provide the message "Not Ready, copy from the document handler when the last document is entered." As still another example, to select and provide a collated set using the platen or a computer forms input, the machine can be programmed for only one set of documents. To request a collated job for more than one set from the platen or computer forms input to be delivered to the top output tray, is an improper request. Thus, if the operator selects a quantity greater than one for a collated job and documents are to be copied from the computer forms input or from the platen, the control will sense an untrained operator if the operator presses start print. Upon pressing start print, the control will provide a message "Not Ready maximum quantity equal one when output is collated and delivered to the top output tray and the documents are copied form the forms feeder or glass."

Figure 6:
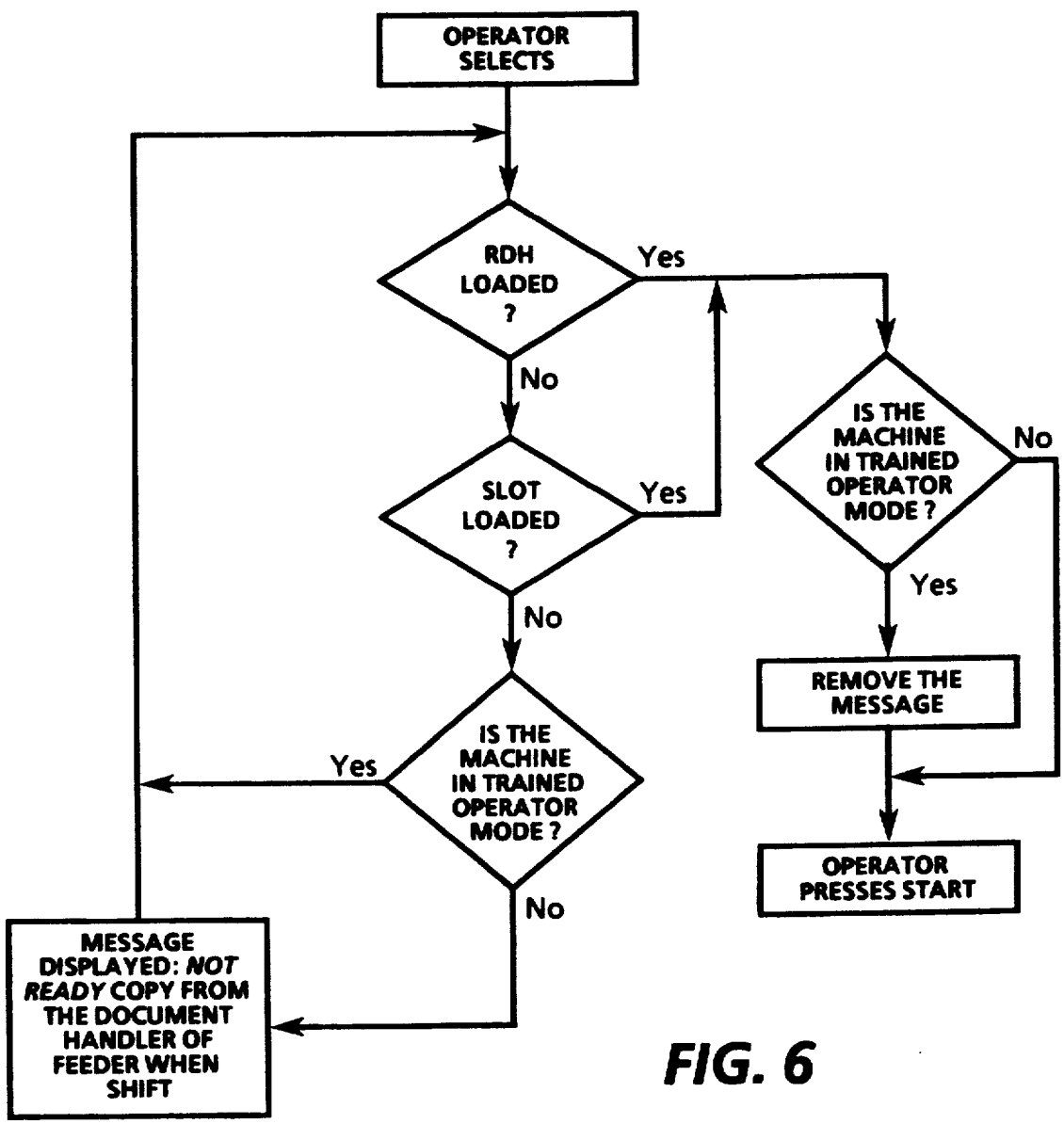
FIGS. 6 and 7 are flow charts of the operation of the machine of FIG. 1 in accordance with the present invention.

With reference to FIG. 6, there is illustrated a typical flow chart, in accordance with the present invention, illustrating the response of the machine control upon the operator selecting image shift. In particular, once the operator selects image shift, the machine determines whether or not the operator is trained or untrained in the following manner. If the RDH is not loaded and the Slot is not loaded, and the operator presses start, the determination is made that the operator is untrained. The message, "NOT READY COPY FROM THE DOCUMENT HANDLER OR FEEDER WHEN SHIFT" or an equivalent is displayed. On the other hand, if either the RDH or the Slot is loaded, the determination is made that the operator is trained, and the message is removed. It should be noted that rather than removing the message, the message could just as well not have been displayed at all.

It should also be noted that in a specific embodiment, the determination of trained or untrained is not made until the operator presses the start button to begin operation of the machine. Up till that time, presumably, the operator could load or unload the RDH or Slot and alter the programming procedure or sequence. However, it is well within the scope of the present invention to determine the relative training of an operator by various other standards. For example, the selection by the operator of a "Help" or "Information" button at the console could automatically trigger the recognition of an untrained operator. In addition, after a predetermined lapse of time, the trained or untrained decision could be made even if a start button has not been pressed. Thus, it would be presumed after a given lapse of time, that the operator will not change the selections. Also, the determination of an untrained operator could be based upon the frequency of changes in programming selections or by the switching back and forth between alternate selections.

It should also be understood that the scope of the invention includes making determinations of a trained or untrained operator at different levels or a hierarchy of levels of programming for a job. Thus, at the stage of the operator selecting, for example, a covers job, as described above, a determination will be made whether the operator is trained or untrained. Whether or not the operator had been determined to be trained or untrained at this first level of programming, a new determination of operating training will be made a second level of programming. For example, if the operator has selected covers and the next level of programming could be, for example, the selection of exceptions to various individual documents in a set of documents to be copied. As the operator proceeds to make selections for exceptions to selected documents in a set of documents, the machine control can determine again whether or not the operator is trained or untrained at this particular level of programming. Thus, the control can move through a hierarchy of decisions at various programming levels to periodically determine whether or not the operator is trained or untrained, and as appropriate, provide the suitable operating messages or prompts to the operator.

Figure 7:
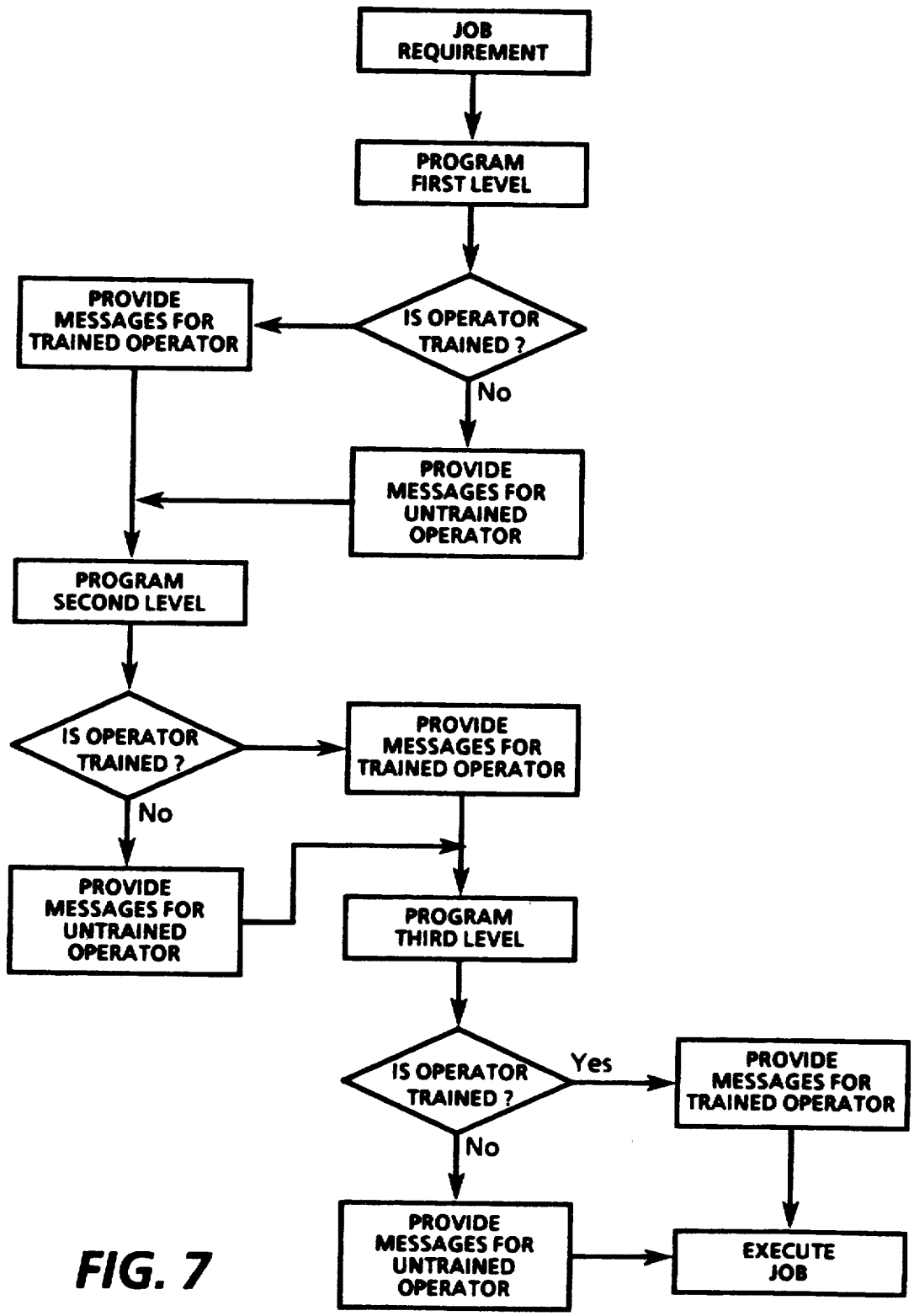

For example, with reference to FIG. 7, at a first level of programming the machine, a determination could be made that the operator is trained or untrained and the suitable operator messages or prompts displayed. This determination could be made based upon the previous action or inaction of the operator. After programming at the first level, there would be programming at a second level and a new determination of operator training made. Thus, the operator may have been determined to be trained at the first level. However, if the operator presses an "Information" button at the second level, or exceeds a given time period in programming the second level, or changes back and forth between optional selections, the operator could be determined to be untrained at the second level. Thus, an operator can initially start as trained, then be determined untrained at the second level, and again trained at the third level. This sequence of programming levels could be continued with operator skill being determined at each level of programming.

Finally, it should be noted that there are various means to convey information to an operator other than messages. Operator prompts or the conveyance of information to the operator could be done by highlighting icons, showing flow charts or trees, and relatively more or less detail of diagnostic fault frames. For example, assume covers are allowed only in collated jobs in a given machine. If the machine were in the untrained operator mode and the operator selected covers, the collated section on the output screen at the operator console could be highlighted or blinked. In essence, the highlighted section would inform the operator that the collated mode was the correct mode.

Icons could also be displayed in a color code. For example, a specific icon or image display could be green for a collated mode and red for an uncollated mode, conveying the information that selecting uncollated would create a conflict. Also, pictorial representations, such as flow charts or trees, displayed when a specific selection is made could illustrate for the operator the specific route or sequence of programming steps ahead and identify options. Fault frames typically display for operator's specific machine zones to clear. For an untrained operator, more detail of the fault zones could be shown.

While the invention has been described with reference to the structure disclosed, it is not confined to the details set forth, but is intended to cover such modifications or changes as may come within the scope of the following claims.

I claim:

1. In a reproduction machine having a control including a user interface with display for providing a hierarchy of operator prompts for programming the operation of the machine, each level of the hierarchy of prompts providing either a corresponding first sequence of prompts for a first category of prompts or a second sequence of prompts for a second category of prompts, the method of automatically altering the prompting of the operator comprising the machine implemented steps of:

programming the machine by the operator at a first level, automatically recognizing the programming of the machine by the control at the first level to be either first category or second category operator programming, responding to the recognition of either first category or second category operator programming at the first level for providing either first category operator prompt or second category operator prompt, programming the machine by the operator at a second level after completion of the programming at the first level, automatically recognizing the programming of the machine by the control at the second level to be either first category or second category operator programming, and responding to the recognition of either first category or second category operator programming at the second level for providing either a first category operator prompt or a second category operator prompt whereby the relative training of the operator determines the type of prompt provided.

2. In a reproduction machine having a control including a user interface with display for programming the machine and providing operator prompts via said display for hierarchical two levels of operator programming, each said level operator programming having a corresponding first sequence and second sequence of operator prompts, the machine recognizing a standard format of operator programming at one of said first level and second level for providing a corresponding first sequence of operator prompts, the method of selectively providing a corresponding second sequence of operator prompts comprising the machine implemented steps of:

recognizing by the control one of the first level and the second level operator programming from the programming of the machine inputted via said user interface, recognizing by the control a deviation from the programming of the machine in said standard format at said recognized level, responding to the recognition of the deviation from the standard format programming at said recognized level, and providing said second sequence of operator prompts via said display at said recognized level of operator programming.

3. The machine of claim 2 including the step of recognizing a deviation from the operator programming of the machine at a second level of operator programming, and responding to the recognition of the deviation of programming at said second level to provide said second sequence of operator prompts.

* * * * *